(12) United States Patent
Bertin et al.

(10) Patent No.: US 8,379,544 B2
(45) Date of Patent: Feb. 19, 2013

(54) COMMUNICATIONS

(75) Inventors: Olivier Bertin, Peymeinade Alpes-Maritimes (FR); Xavier Peuziat, Villemoirieu (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 790 days.

(21) Appl. No.: 12/359,026

(22) Filed: Jan. 23, 2009

(65) Prior Publication Data

US 2009/0190736 A1 Jul. 30, 2009

(30) Foreign Application Priority Data

Jan. 25, 2008 (EP) .................................. 08300051

(51) Int. Cl.
*H04M 3/42* (2006.01)
(52) U.S. Cl. ........ 370/261; 370/260; 370/352; 370/354; 709/206; 709/227
(58) Field of Classification Search .................. 370/260, 370/352, 354, 328; 709/206, 227
See application file for complete search history.

(56) References Cited

U.S. PATENT DOCUMENTS

| 7,590,692 | B2 * | 9/2009 | Van Dyke et al. | 709/206 |
| 8,010,125 | B2 * | 8/2011 | Oyama | 455/456.1 |
| 8,107,402 | B1 * | 1/2012 | Everson et al. | 370/260 |
| 8,122,090 | B2 * | 2/2012 | Thomas et al. | 709/206 |
| 2003/0145054 | A1 | 7/2003 | Dyke | |
| 2004/0071099 | A1 * | 4/2004 | Costa-Requena et al. | 370/260 |
| 2005/0058125 | A1 * | 3/2005 | Mutikainen et al. | 370/354 |
| 2006/0209775 | A1 * | 9/2006 | Lim et al. | 370/338 |
| 2006/0271686 | A1 * | 11/2006 | Sekaran | 709/227 |
| 2008/0192733 | A1 * | 8/2008 | Song et al. | 370/352 |

FOREIGN PATENT DOCUMENTS

WO 2004/077796 9/2004

OTHER PUBLICATIONS

Tian Q Sun Huawei Technologies, Session Initiation Protocol (SIP) Invite with Conference Info, IETF, CH, No. 2, Jun. 26, 2007.

* cited by examiner

*Primary Examiner* — Andrew Chriss
*Assistant Examiner* — Mohamed Kamara

(57) ABSTRACT

A method and system for establishing a conference call is presented. The method uses the Session Initiation Protocol for transporting conference information to a conference server, wherein the conference is represented in a markup language.

17 Claims, 7 Drawing Sheets

COMMUNICATIONS

RELATED APPLICATION

This application claims priority to European Patent Application Serial No. 08300051.3 filed Jan. 25, 2008, entitled "IMPROVEMENTS IN OR RELATING TO COMMUNICATIONS," which is commonly assigned.

FIELD OF THE INVENTION

This invention relates to the field of communications, and more particularly to a method and system for establishing multi-point communications such as conference calls.

BACKGROUND

Conference calls are used to enable a calling party to have more than one party partake in a call. Such a conference call may allow a called party to participate during the call, or the conference call may be established so that a called party merely listens into the call and cannot speak to the other parties.

Conferencing services are increasingly used in next generation networks. Multimedia conferences that can support several media types, such as video and "chat" type messaging, provide network service providers with new possibilities for providing innovative group communication services to customers.

Methods and protocols have been defined for signaling of multimedia conferences in Internet Protocol networks. However, there is no standard protocol for the creation and subsequent modification of a multimedia conference and its attributes (e.g. participants, time schedule, available media, etc).

Several conference control protocol (CCP) proposals have already been proposed for creating and modifying conferences on conference servers in IP networks. These proposals rely on complex conference control syntax and semantics to manipulate conference information, and are not widely supported by existing conference clients, especially mobile phones. Accordingly, they have not gathered real acceptance in the industry.

BRIEF DESCRIPTION OF THE DRAWINGS

For a better understanding of the invention, embodiments will now be described, purely by way of example, with reference to the accompanying drawings, in which.

DETAILED DESCRIPTION OF THE INVENTION

According to an aspect of the invention, there is provided a method for establishing a conference call using a conference server, the method comprising the steps of: generating a session initiation protocol, SIP, request message; and transmitting the SIP request message to the conference server, wherein the SIP request message comprises conference information regarding the conference call represented in a markup language.

The invention proposes a conference control protocol based on the SIP protocol already used for conference signaling and state notification. It uses SIP for the transport protocol between client and server, with XML conference information being provided in a SIP message. The XML conference information may be provided not only in the message body, but also in the SIP message header field(s).

SIP stacks are already available on conventional mobile devices. Thus the invention can be widely supported by existing client terminals.

Figure 1:
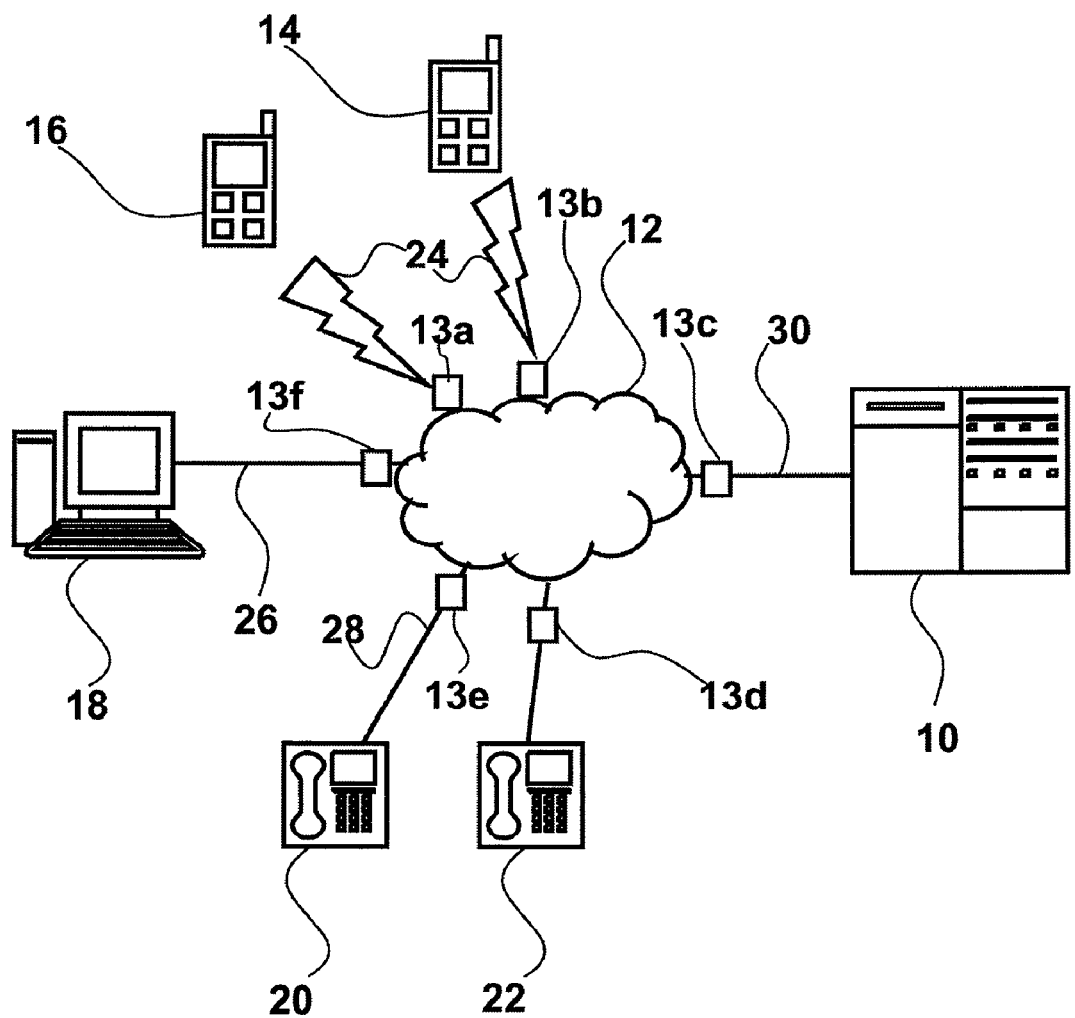
FIG. 1 is a high-level block diagram of a system for establishing conference calls according to an embodiment of the invention.

Referring to FIG. 1, a conferencing system for establishing a conference call between a plurality of client terminal devices comprises a conference server 10 that is accessible from a the plurality of terminal devices via a suitable communication network 12, such as an Internet protocol network. A number of gateways 13*a* to 13*f* are also provided to convert between different communication protocols used by the different terminal devices, where required.

The plurality of terminal devices comprises first 14 and second 16 mobile devices, a personal computer 18, and first 20 and second 22 Plain Old Telephone Service-type (POTS-type) devices.

Each of the first 14 and second 16 mobile devices includes a processor and a mobile network communications unit. The mobile network communications unit of each mobile device is in wireless communication (indicated generally by feature 24) with the communications network 12 in a known way, for example using General Packet Radio Services (GPRS), Third Generation (3G), or any other suitable mobile communications standard for the data link layer.

The second mobile device 16 differs from the first mobile device 14 in that it also comprises a video camera and a suitable software application enabling the mobile device 16 to be used as a video conferencing device. In other words, the second mobile 16 can send and receive video data via the wireless communication link 24.

The personal computer (PC) 18 is a conventional PC having a network communications unit for communicating with the communication network 12 via the internet 26. The PC 18 in this embodiment includes a suitable software application for enabling a user of the PC 18 to make calls to other terminal devices via the internet 26. Such software is well known in the art and will not be described further.

Each of the first 20 and second 22 POTS-type devices includes a processor and a POTS-type communications unit. The POTS-type communications unit of each POTS-type device is in communication with the communications network 12 via a POTS connection 28 (i.e. a Public Switched Telephone Network (PSTN) link).

The conference server 10 is connected to the communication network 12 via a suitable communication link 30, such as an Ethernet link, and adapted to receive and store scheduling requests and/or information from at least one of the terminal devices. The requests and/or information are transmitted and received using the Session Initiation Protocol (SIP). In this way, a user of a terminal device can arrange a conference call by providing relevant information to the conference server in the form of a SIP request message.

SIP is a known application-layer signaling protocol suitable for creating, modifying and terminating sessions with one or more participants. It can be used to create communication sessions that include Internet telephone calls, multimedia distribution and multimedia conferences. SIP can be independent of the underlying transport layer (i.e. it can run on TCP, UDP or SCTP). SIP is well known in the art and, accordingly, will not be described in detail hereinafter. More information about the SIP can be found in latest version of the specification (RFC 3261) from the IETF SIP Working Group.

Creation, modification and deletion of conference calls is performed by exchanging conference information between a client terminal (the conference control client) and the conference server 10 in eXtensible Markup Language (XML) documents. The conference information XML documents are transmitted to the conference server 10 in SIP requests (for example, a SIP INVITE request) and SIP responses are transmitted from the conference server 10 to a client terminal device. Purely by way of example, a SIP request may include an XML conference information document containing details specifying the date and time of a proposed conference call, along with details of the proposed participants and required security information (such as a passcode). The conference server 10 can then use such details to establish a conference call at the proposed time.

To establish a conference call, the conference server 10 can call participants in order to connect the participants to the same conference call. Alternatively, the conference server 10 may simply send a reminder message to the participants, which reminds the recipients that they are due to participate in conference call. This reminder may also include information relevant to the conference call, such as the address/number (URI) to connect to, and the required security information. Of course, at the proposed time, the conference server 10 need not call or send a message to the proposed participants. Instead, a participant (i.e. the user that requested the conference call) may call the conference server 10 in order to establish the conference call.

In the embodiment of FIG. 1, the conference server 10 sends a SIP message to the client terminal (conference control client), the SIP response message comprising an XML document containing information regarding the conference call (such as identifiers, auxiliary services and security information/verification information). The SIP response is also sent with a status code, for example "200" indicating a successful response (i.e. "OK), or "302" indicating a redirection response (i.e. "moved temporarily). Furthermore, the SIP response also includes header information informing the client of the allocated SIP address (URI) of the conference described in the XML document of the SIP response, and the duration of time for which the URI will be valid.

Ad-hoc conferences are started immediately, whereas reserved or scheduled conferences are created with time schedule information and then started later as per the conference schedule. For reserved/scheduled conferences, the conference server 10 may be adapted to send a message to the client terminal(s) reminding each recipient that they are due to participate in a conference call and asking whether they wish to connect to the conference call. The recipient can either reject or accept the message, and if the message is accepted the corresponding terminal device automatically connects to the conference call, for example by executing a set of instructions that causes the terminal device to call the required number and provide the necessary security information.

Pre-scheduled or reserved conferences may also have their definition modified before they take place, and may be deleted so that they never actually take place. Modification and/or deletion of a reserved conference is performed by sending a SIP request to the conference server 10, wherein the SIP request contains one or more XML documents representing information about the conference to be modified/deleted.

Thus, it will be understood that embodiments of the invention send XML conference call descriptors to a conference server using SIP.

For a better understanding, a method according to an embodiment of the invention will now be described with reference to FIGS. 2 and 3.

In step 210, a user of a terminal device controls the terminal device to generate a SIP INVITE request message comprising an XML conference information document (conference-info). The conference-info xml body provided in the SIP INVITE message does not contain the 'entity' attribute of 'conference-info' root element, otherwise it will be understood by a conference server 10 to be a re-INVITE message for modifying an already reserved conference. Further, the conference-info xml body provided in the SIP INVITE message preferably does not contain a conference address (confi-uri), although if included it will be ignored by a conference server 10.

An exemplary conference-info1 xml body of such an SIP INVITE request is as follows (wherein the contents of portions of the xml body are labeled and described using exclamation mark-based comments, "<!—>"):

```
<?xml version="1.0" encoding="UTF -8"?>
  <conference-info
xmlns="urn:ietf:params:xml:ns:conference-schema">
    <! -- CONFERENCE DESCRIPTION -->
    <conference-description xml:lang="en-us">
    <display -text>video multicast and discussion of
Formula -1 racing</display-text>
      <subject>Sports: Formula-1</subject>
      <free-text>This is a conference example</free -
text>
      <keywords>Formula -1, cars</keywords>
      <! -- CONFERENCE TIME -->
      <conference-time>
        <entry>
        <base>BEGIN:VCALENDAR
        BEGIN:VEVENT
        DTSTAMP:20061103T140728Z
        UID:20061103T140728Z -345FDA-alice@ics.net
        ORGANIZER:MAILTO:alice.w@ics.net
        DTSTART:20071017T143000Z
        RRULE:FREQ=WEEKLY
        DTEND:20071217T163000Z
        END:VEVENT
        END:VCALENDAR
        </base>
        <mixing-start-offset required-
        participant="moderator">2007 -10-
17T14:29:00Z</mixing -start-offset>
        <mixing-end-offset required-
        participant="participant">2007 -10-
17T16:31:00Z</mixing -end-offset>
        <must-join-before-offset>2007 -10-
17T15:30:00Z</must-join-before-offset>
        </entry>
      </conference-time>
      <! -- NO CONFERENCE URIS -->
      <! -- NO SERVICE URIS -->
      <! -- MAXIMUM USER COUNT -->
      <maximum-user-count>
        <entry role="administrator ">1</entry>
        <entry role="participant">10</entry>
      </maximum-user-count>
      <!-- AVAILABLE MEDIA -->
      <available-media>
        <entry label="10234">
          <display-text>main audio</display-text>
          <type>audio</type>
          <status>sendrecv</status>
          <mixing-mode>automatic</mixing -mode>
```

```
            <mix-level>3</mix-level>
            <codecs decision="automatic">
                <codec name="PCMU"
                policy="allowed"/>
            </codecs>
        </entry>
        <entry label="10235">
            <display-text>main video</display-text>
            <type>video</type>
            <status>sendrecv</status>
            <mixing-mode>automatic</mixing-mode>
            <mix-level>4</mix-level>
            <codecs decision="automatic">
                <codec name="H.263"
                policy="allowed"/>
            </codecs>
        </entry>
        <entry label="10236">
            <display-text>main chat</display-text>
            <type>message</type>
            <status>sendrecv</status>
        </entry>
    </available-media>
</conference-description>
<!-- HOST INFO -->
<host-info>
    <display-text>Formula1</display-text>
    <web-page>http://bob.contents.mpcb.ics.net/formula1/</web-page>
    <uris state="full">
        <entry>
            <uri>sip:alice@ics.net</uri>
        </entry>
    </uris>
</host-info>
<!-- NO CONFERENCE STATE -->
<!-- NO FLOOR INFORMATION -->
<!-- USERS -->
<users state="full">
    <join-handling>allow</join-handling>
    <!-- ALLOWED USERS LIST -->
    <allowed-users-list>
        <target uri="sip:alice@ics.net" method="dial-in"/>
        <target uri="sip:bob@ics.net" method="dial-in"/>
        <target uri="sip:mary@ics.net" method="dial-in"/>
    </allowed-users-list>
    <!-- USER ALICE -->
    <user entity="sip:alice@ics.net">
    <display-text>Alice Wonderland</display-text>
    <associated-aors">
    <entry>
        <uri>mailto:alice.w@ics.net</uri>
        <display-text>email</display-text>
    </entry>
    </associated-aors>
    <provide-anonymity>false</provide-anonymity>
    <roles>
        <entry>administrator</entry>
    </roles>
    <languages>en</languages>
<!-- NO ENDPOINT -->
</user>
<!-- USER BOB -->
<user entity="sip:bob@ics.net">
<display-text>Bob Brown</display-text>
<associated-aors">
<entry>
    <uri>mailto:bob.b@ics.net</uri>
    <display-text>email</display-text>
</entry>
</associated-aors>
<provide-anonymity>false</provide-anonymity>
<roles>
    <entry>participant</entry>
</roles>
<languages>en</languages>
            <allow-refer-users-dynamically>true</allow-refer-users-dynamically>
            <allow-invite-users-dynamically>false</allow-invite-usersdynamically>
            <allow-remove-users-dynamically>false</allow-remove-usersdynamically>
            <!-- NO ENDPOINT -->
        </user>
        <!-- USER MARY -->
        <user entity="sip:mary@ics.net">
        <display-text>Mary Poppins</display-text>
        <associated-aors>
        <entry>
            <uri>mailto:mary.p@ics.net</uri>
            <display-text>email</display-text>
        </entry>
        </associated-aors>
        <provide-anonymity>false</provide-anonymity>
        <roles>
            <entry>participant</entry>
        </roles>
        <languages>en</languages>
        <!-- NO ENDPOINT -->
        </user>
    </users>
    <!-- NO SIDEBARS BY REFERENCE -->
    <!-- NO SIDEBARS BY VALUE -->
</conference-info>
```

From the above exemplary code, it will be appreciated that the conference-info xml body of the SIP INVITE request contains information regarding the date and time of the conference call, the identity and contact details of the participants, the available media, the host, and preferred establishment methods. The preferred establishment method defines how a user wishes to establish the conference call, i.e. whether or not all users are to dial in to the conference call.

In step 215, the generated SIP INVITE request is transmitted from the client terminal to the conference server 10. In this example, the INVITE request message is targeted to a specific SIP address (URI) which identifies the location of the conference factory function of the conference server 10, i.e conf-factpry@as.ics.net.

The conference factory of the conference sever 10 is responsible for creating new conferences as requested in the conference-info xml body of the INVITE request message. Accordingly, the conference server 10 receives the SIP INVITE request and extracts information about the requested conference from the conference-info XML body of the INVITE request. Based on the extracted information, the required conference information and resources are checked, reserved and stored by the conference sever 10 in step 220.

If a conference according to the requested conference-info can be successfully allocated or provided for by the conference server 10, the conference control server 10 sends a SIP response message to the conference client terminal in step 225.

Figure 3:
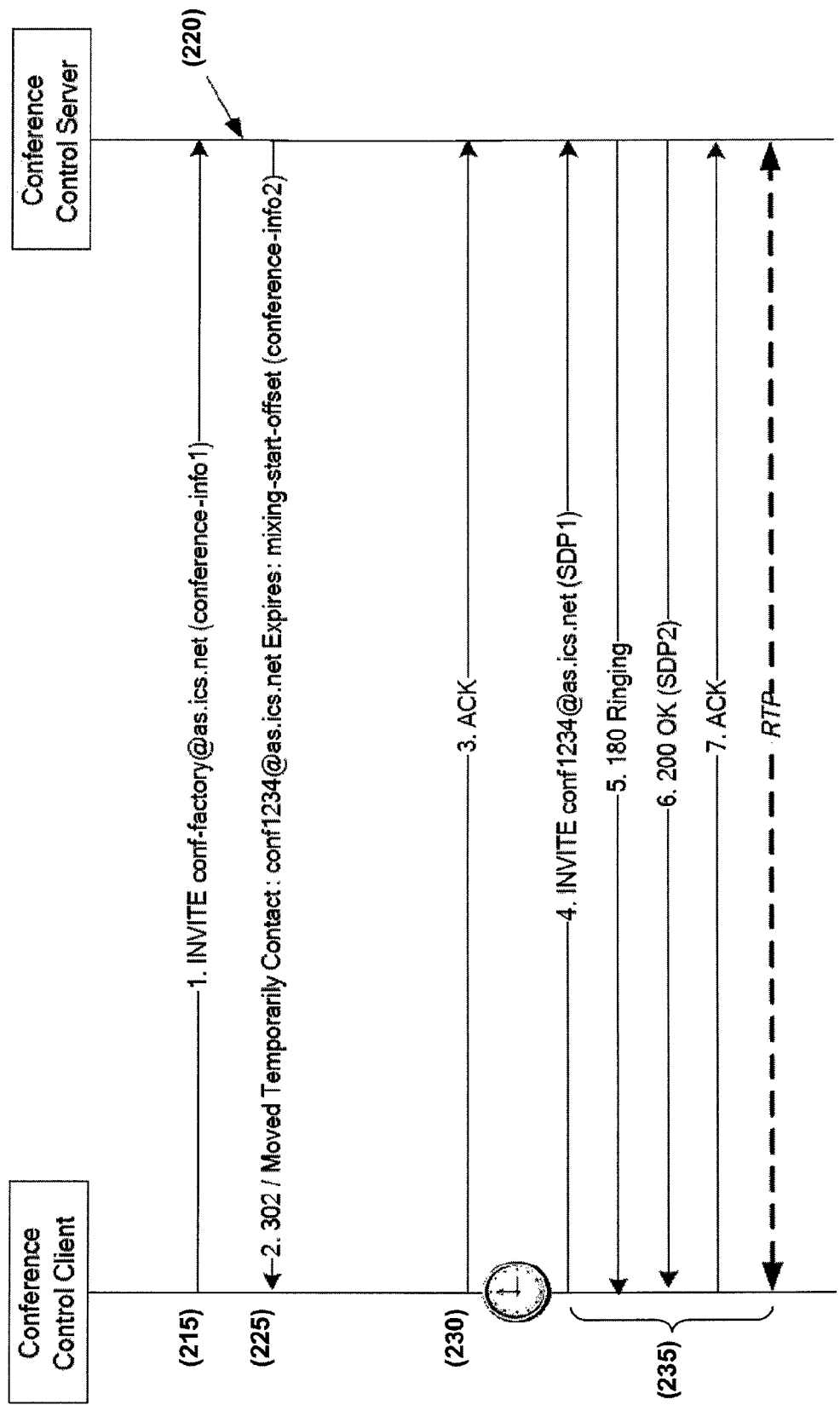
FIG. 3 is a signal flow diagram of an exemplary implementation of the method of FIG. 2.

In the example shown in FIG. 3, a SIP response message with status code "302—Moved Temporarily" is sent to the conference control client. The allocated conference address (conf-uri) "conf1234@as.ics.net" that identifies the conference being described in the XML document body of the SIP response is provided in the contact header field, and the duration of the validity of the conference address (conf-uri) is indicated in the "Expires" header field.

Similarly to the SIP INVITE request, the SIP response message contains an XML conference-info document. An exemplary xml body (conference-info2) of the SIP response message is as follows (wherein the contents of portions of the xml body are again labeled and described using exclamation mark-based comments, "<!—>"):

```
<?xml version="1.0" encoding="UTF -8"?>
  <conference-info
  xmlns="urn:ietf:params:xml:ns:conference-schema"
  entity="sip:conf=1234@as.ics.net" state="full">
    <! -- CONFERENCE UNIQUE IDENTIFIERS -->
    <conf-uris state="full">
      <entry>
        <uri>tel:+3585671234</uri>
        <display-text>Conference Bridge Number</display -
        text>
        <purpose>participation</purpose>
      </entry>
      <entry>
        <uri>http://www.example.comlive.ram</uri>
        <purpose>streaming</purpose>
      </entry>
    </conf -uris>
    <! -- SERVICE URIS -->
    <service -uris state="full">
      <entry>
        <uri>http://bob.contents.mpcb.ics.net/formula1/</uri>
        <purpose>web-page</purpose>
      </entry>
    </service-uris>
  </conference-info>
```

This conference-info document contains 'conf-uris' and 'service-uris' elements for the reserved conference, providing the client with identifiers to be used in order to access the conference by different signaling means, as well as auxiliary services available for the conference.

The conference control client receives the SIP response message from the conference server 10 and then acknowledges safe receipt of the SIP response message by sending a SIP successful response (i.e. a response with status code "200—OK") to the conference server (step 230).

At the scheduled date and time, the conference control client sends a SIP INVITE request to the conference address (conf-uris) conf1234@as.ics.net allocated by the conference server, in order to initiate the conference call (step 230). The known SIP responses and requests are then used to initiate and establish the conference call. For example, as shown in FIG. 3, the conference server responds to the SIP INVITE request by sending a "180 Ringing" SIP informational response and then a "200 OK" SIP successful response when initiating and connecting the conference all, and the conference control client subsequently acknowledges the successful connection, thereby establishing the conference call (over a RTP transport layer in the example of FIG. 3).

A method of modifying an existing reserved conference according one embodiment of the invention will now be described with reference to the diagrams shown in FIGS. 4 and 5. Here it is assumed that a conference call has already been reserved as described above with reference to steps 210 to 230.

To modify an existing reserved conference, a conference control client updates the XML conference information document (conference-info) and generates a new/updated SIP INVITE request (i.e. a re-INVITE request) containing the modified XML conference-info document (i.e. conference-info2) in step 410.

The conference-info xml body provided in the SIP re-INVITE message for modifying the already-booked conference contains the 'entity' attribute of 'conference-info' root element with the allocated SIP address (conf-uri) of the booked conference (as provided in the SIP "302—Moved Temporarily" response when the conference server 10 previously reserved the conference, for example conf1234@as.ics.net).

An exemplary conference-info2 xml body of such a SIP re-INVITE request is as follows (wherein the contents of portions of the xml body are labeled and described using exclamation mark-based comments, "<!—>"):

```
<?xml version="1.0" encoding="UTF-8"?>
  <conference-info
  xmlns="urn:ietf:params:xml:ns:conference-schema"
  entity="sip:conf=1234@as.ics.net">
    <! -- CONFERENCE TIME -->
    <conference-time>
      <entry>
        <base>BEGIN:VCALEN DAR
        BEGIN:VEVENT
        DTSTAMP:20061103T140728Z
        UID:20061103T140728Z -345FDA-alice@ics.net
        ORGANIZER:MAILTO:alice.w@ics.net
        DTSTART:20071017T143000Z
        RRULE:FREQ=WEEKLY
        DTEND:20071217T163 000Z
        END:VEVENT
        END:VCALENDAR
        </base>
        <mixing-start-offset required-
        participant="moderator">2007-10-
        17T15:29:00Z</mixing-start-offset>
        <mixing-end-offset required-
        participant="participant">2007-10-
        17T17:31:00Z</mixing-end-offset>
        <must-join-before-offset>2007-10-
        17T16:30:00Z</must-join-before-offset>
      </entry>
    </conference-time>
  </conference-info>
```

It will be appreciated that the above example of a conference-info2 XML body of a SIP re-INVITE request delays a conference that was previously booked using the conference-info1 XML document (detailed at pages 6-11) by 1 hour. Thus, the XML conference information document of the re-INVITE request contains information regarding the date and time of the conference call. It will also be appreciated that the XML conference information document of the re-INVITE request can also contain other information about the modified conference call, such as new identity and contact details of the participants, changes in available media, the host, and preferred establishment methods.

In step 415, the generated SIP re-INVITE request containing the modified XML conference information document (conference-info2) is transmitted from the client terminal to the conference server 10. As before, the INVITE request message is targeted to the SIP address (URI) which identifies the location of the conference factory function of the conference server 10, i.e conf-factory@as.ics.net.

Accordingly, the conference server 10 receives the SIP re-INVITE request and extracts information about the modified conference from the conference-info2 XML body of the SIP re-INVITE request. Based on the extracted information, the new conference information and resources are checked in step 420, reserved and stored by the conference sever 10 in step 425.

The conference control server 10 then sends a SIP response message to the conference client terminal in step 430. In the example shown in FIG. 5, a SIP response message with status code "302—Moved Temporarily" is sent to the conference control client. The allocated conference address (conf-uri) (shown as conf1234@as.ics.net in FIG. 5) that identifies the conference being described in the XML document body of the SIP response is provided in the contact header field, and the duration of the validity of the conference address (conf-uri) is indicated in the "Expires" header field. The duration is set to the relative time from scheduling time to mixing-start-offset element's time value retrieved from the conference-info document.

Similarly to the SIP INVITE request, the SIP response message contains an XML conference-info document. An exemplary xml body (conference-info2) of the SIP response message is as follows (wherein the contents of portions of the xml body are again labeled and described using exclamation mark-based comments, "<!—>"):

```
<?xml version="1.0" encoding="UTF -8"?>
  <conference-info
xmlns="urn:ietf:params:xml:ns:conference -schema"
entity="sip:conf=1234@as.ics.net" state="full">
    <! -- CONFERENCE UNIQUE IDENTIFIERS -->
    <conf-uris state="full">
      <entry>
        <uri>tel:+3585671234</uri>
        <display-text>Conference Bridge
Number</display-text>
        <purpose>participation</purpose>
      </entry>
      <entry>
        <uri>http://www.example.comlive.ram</uri>
        <purpose>streaming</purpose>
      </entry>
    </conf-uris>
    <! -- SERVICE URIS -->
    <service-uris state="full">
      <entry>
        <uri>http://bob.contents.mpcb.ics.net/
formula1/</uri>
        <purpose>web-page</purpose>
      </entry>
    </service-uris>
  </conference-info>
```

Other SIP response messages may instead be sent from the conference control server to the conference client terminal in step 430. For example, the conference control sever 10 may transmit a SIP client response failure (with appropriate status code) from the following list of options:

400 Bad Request;
401 Unauthorised;
403 Forbidden—i.e. if the modification request in the conference information XML body is not allowed;
404 Not Found—if the conference address (conf-uri) does not refer to an already booked conference; or
486 Busy Here—if the conference is already started.

It will be understood that the above list is not exhaustive, and other SIP response messages may be provided by the conference server.

Figure 2:
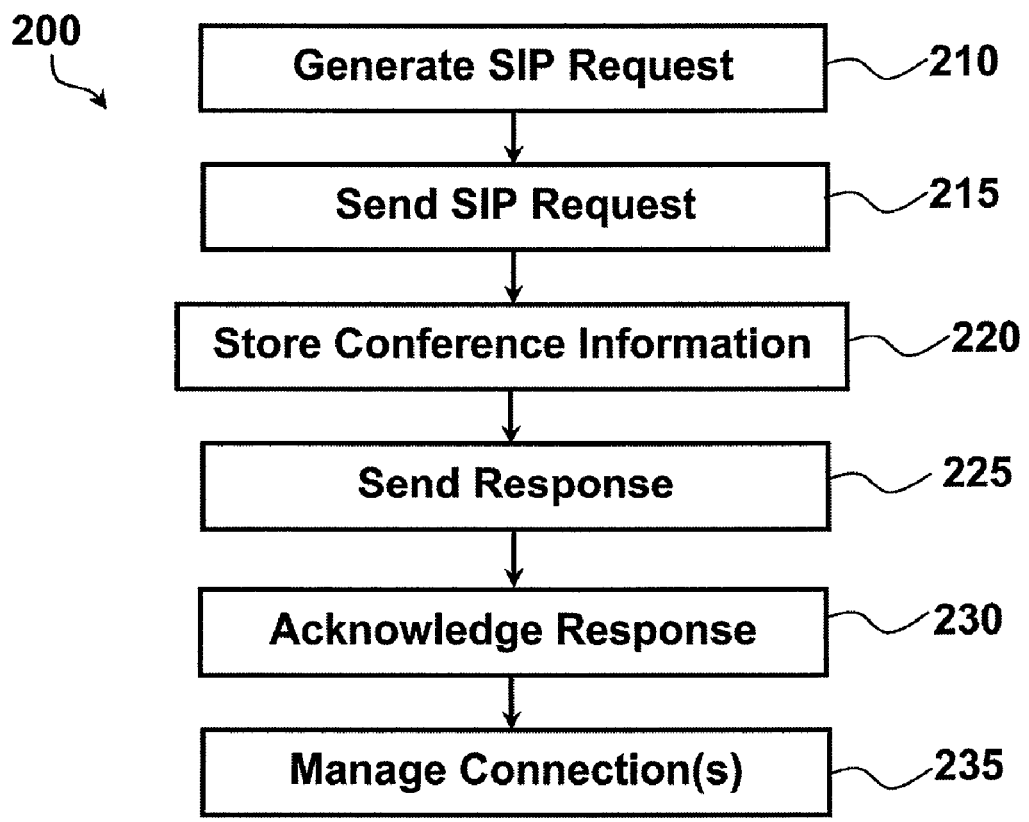
FIG. 2 is a flow diagram of a method according to an embodiment of the invention.
Figure 4:
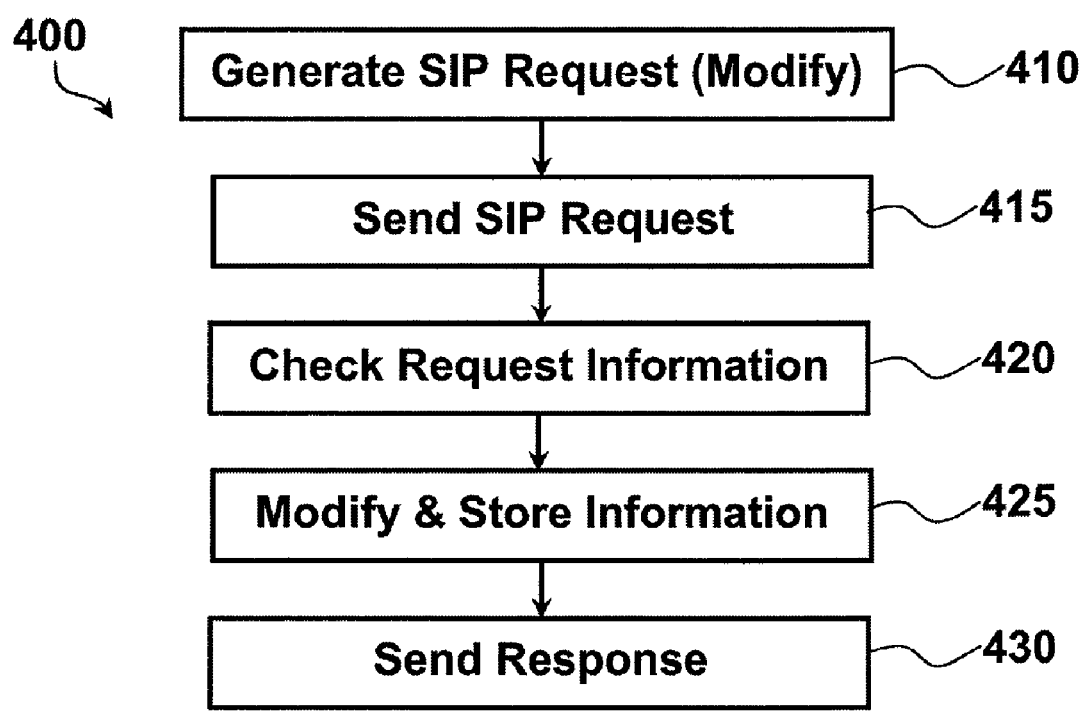
FIG. 4 is a flow diagram of a method according to another embodiment of the invention.
Figure 5:
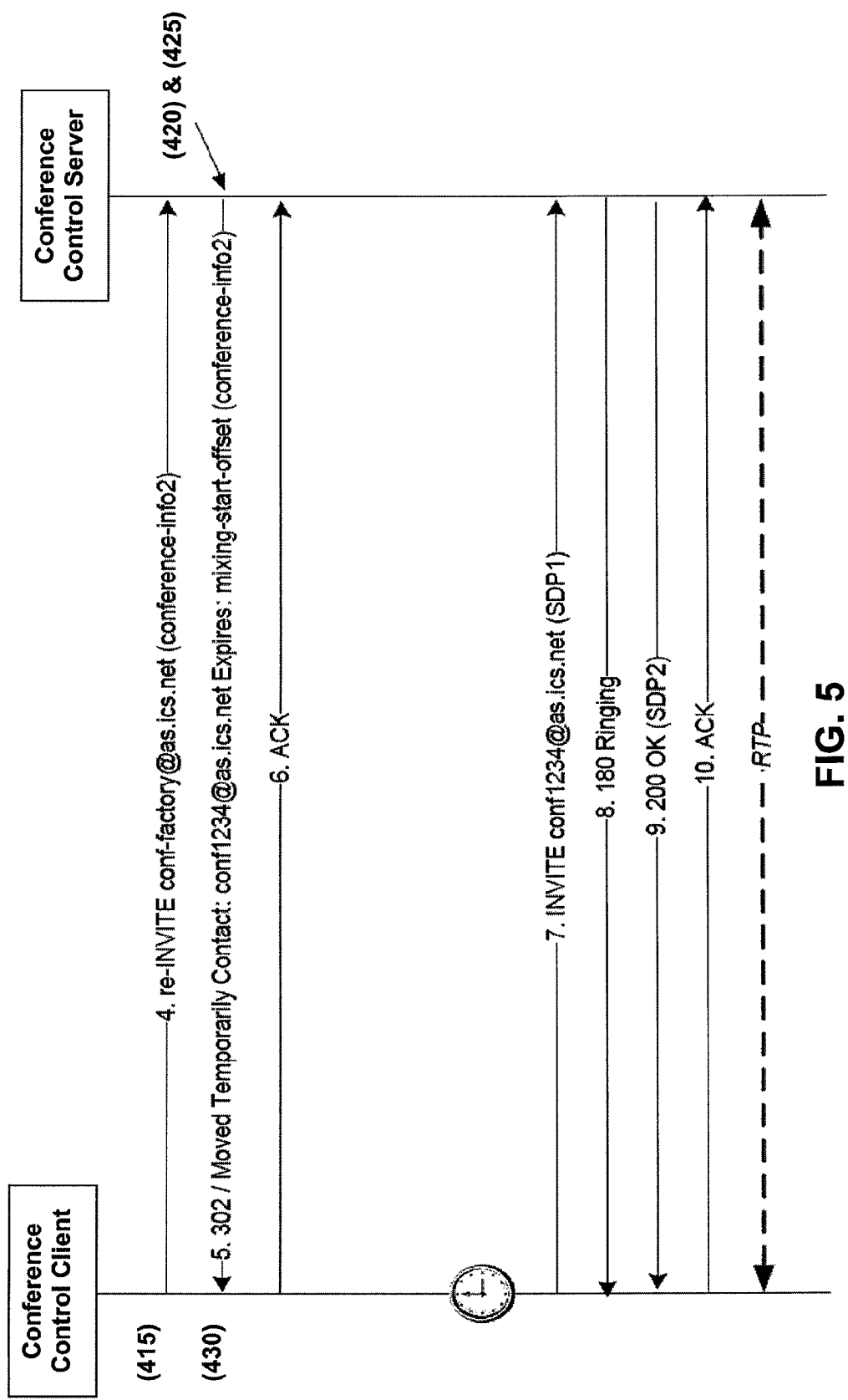
FIG. 5 is a signal flow diagram of an exemplary implementation of the method of FIG. 4.

It will therefore be understood that the method of FIGS. 4 and 5 differs from that of FIGS. 2 and 3 by virtue of the content of the XML conference information document contained in the generated SIP INVITE request. To create a new conference call, the conference information XML body does not contain the 'entity' attribute, whereas, to modify a reserved conference call, the conference information XML body does contain the 'entity' attribute detailing the allocated SIP address (conf-uri) of the reserved conference.

The common aspect linking the methods is that they both transmit a SIP request message to the conference server, wherein the SIP request message comprises conference information represented in an XML-based document or body portion.

Figure 6:
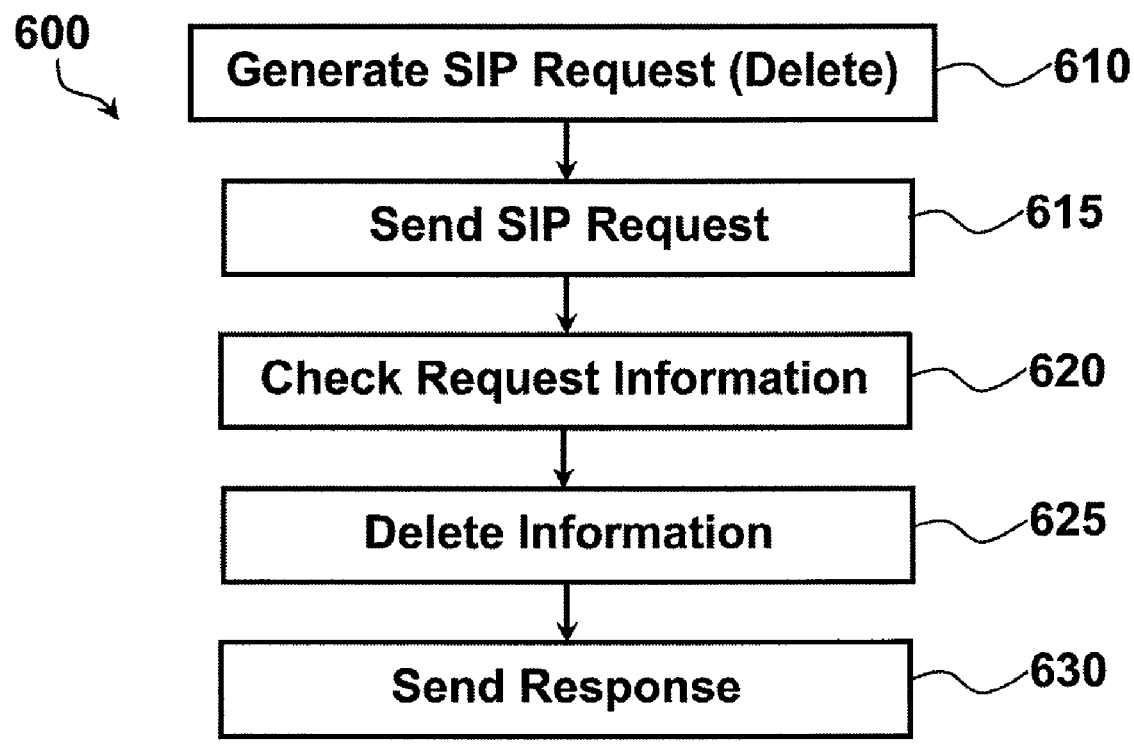
FIG. 6 is a flow diagram of a method according to another embodiment of the invention.
Figure 7:
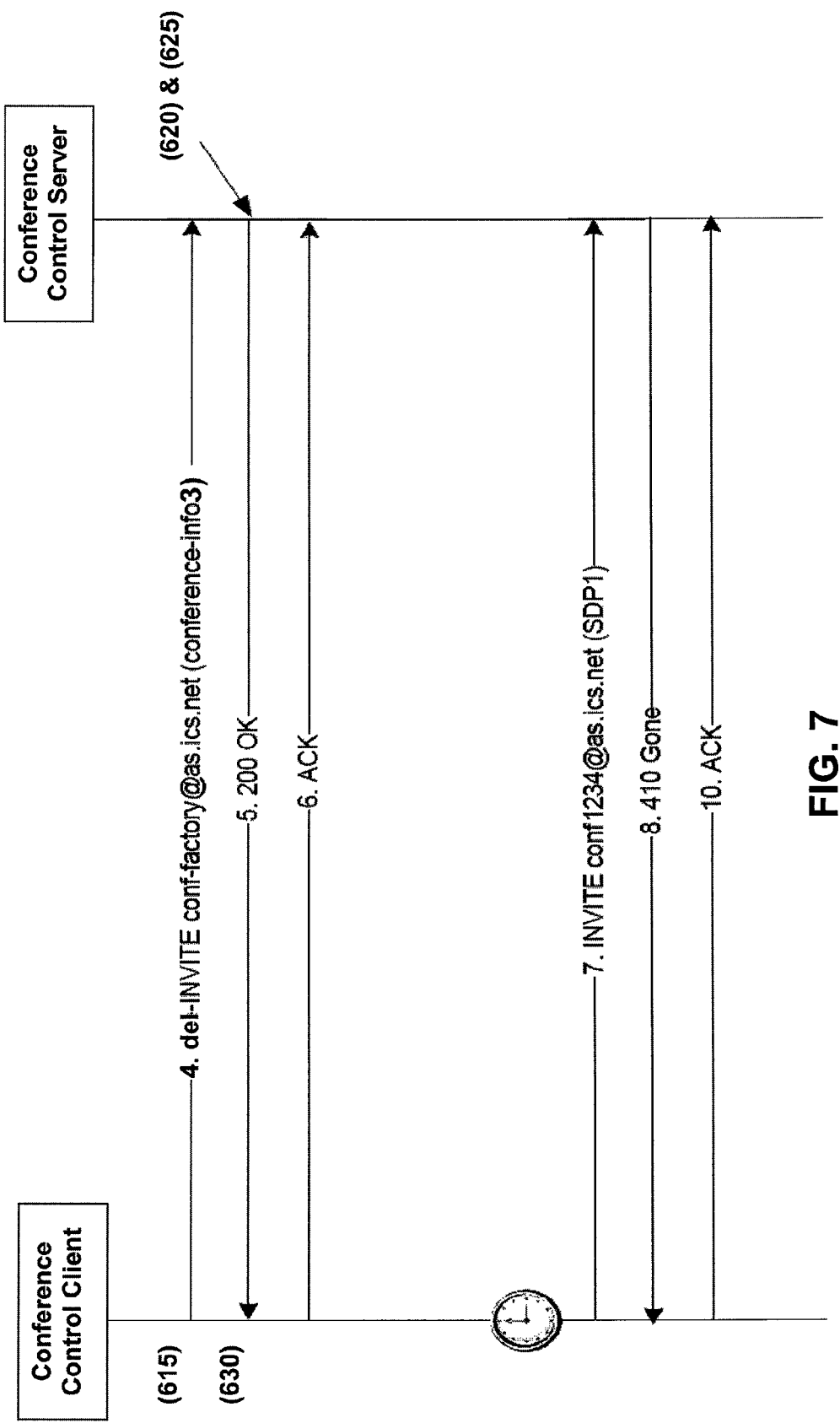
FIG. 7 is a signal flow diagram of an exemplary implementation of the method of FIG. 6.

A method of deleting an existing reserved conference according to the invention will now be described with reference to the diagrams shown in FIGS. 6 and 7. As with the previously detailed method of modifying a reserved conference call, it is assumed that a conference call has already been reserved (for example, as described above with reference to steps 210 to 230).

To delete an existing reserved conference, a conference control client generates a new SIP del-INVITE request containing a XML conference-info document (i.e. conference-info3) in step 610.

The conference-info3 XML body provided in the SIP del-INVITE message for deleting the already-booked conference contains the 'entity' attribute of 'conference-info' root element with the allocated SIP address (conf-uri) of the booked conference (as provided in the SIP "302—Moved Temporarily" response when the conference server 10 previously reserved the conference, for example conf1234@as.ics.net). Further, the 'state' attribute of the 'conference-info' root element is provided with the value "deleted".

An exemplary conference-info3 xml body of such an SIP del-INVITE request is as follows (wherein the contents of portions of the xml body are labeled and described using exclamation mark-based comments, "<!—>"):

```
<?xml version="1.0" encoding="UTF -8"?>
  <conference-info
xmlns="urn:ietf:params:xml:ns:conference -schema"
entity="sip:conf1234@as.ics.net" state="deleted">
  </conference-info>
```

It will be appreciated that the above example of a conference-info3 XML body of a SIP del-INVITE request changes the state of the reserved conference (with allocated address conf1234@as.ics.net) to "deleted", thereby indicating that the reserved conference is to be deleted.

In step 615, the generated SIP del-INVITE request containing the modified XML conference information document (conference-info3) is transmitted from the client terminal to the conference server 10. As before, the INVITE request message is targeted to the SIP address (URI) which identifies the location of the conference factory function of the conference server 10, i.e conf-factory@as.ics.net.

Accordingly, the conference server 10 receives the SIP del-INVITE request and extracts information about the modified conference from the conference-info2 XML body of the SIP re-INVITE request. Based on the extracted information, the new conference information and resources are checked in step 620 and freed/deleted in step 625.

The conference control server 10 then sends a SIP response message to the conference client terminal in step 630, which is subsequently acknowledged by the conference control client. In the example shown in FIG. 5, a SIP response message with status code "200—OK" is sent to the conference control client, thereby indicating that the conference has been successfully deleted. Other SIP response messages may instead be sent from the conference control server to the conference client terminal in step 630. For example, the conference control sever 10 may transmit a SIP client response failure (with appropriate status code) from the following list of options:

400 Bad Request;
401 Unauthorized;
403 Forbidden—i.e. if the modification request in the conference information XML body is not allowed;

404 Not Found—if the conference address (conf-uri) does not refer to an already booked conference; or 486 Busy Here—if the conference is already started.

It will be understood that the above list is not exhaustive, and other SIP response messages may be provided by the conference server If a client terminal later sends an INVITE request to the control server 10 requesting a conference call having the same address as a deleted conference (for example, conf1234@as.ics.net as in the example of FIG. 7), the control server 10 will determine that the requested conference address, along with the corresponding resources, no longer exist and send an appropriate response to the client terminal. In the example of FIG. 7, the control server transmits a SIP client response failure with the status code "410—Gone: The user existed once, but is not available here any more".

The invention proposes a conference control protocol based on the SIP protocol already used for conference signaling and state notification. It uses SIP for transport protocol, with a conference information XML document in an SIP message. It also uses SIP message header fields to pass a conference address (URI) between client and server.

The advantage of using SIP rather than any other conference control protocol is that SIP stacks are already available on conventional mobile devices. Another advantage is associated with the way in which the XML is incorporated into standard SIP headers. This is done in such a way that existing SIP headers are used for a purpose which is different from that which was originally intended. In other words, embodiments of the invention are adapted to use the SIP header info in a new way.

Embodiments can use XCON conference information XML document format for exchanging conference definitions between client and server Thus, the invention does not create new protocols nor does it create specific headers that clients and servers would otherwise require. Excessive development investment and interoperability issues can therefore be avoided by employing the invention.

While specific embodiments have been described herein for purposes of illustration, various modifications will be apparent to a person skilled in the art and may be made without departing from the scope of the invention.

The invention claimed is:

1. A method for establishing a conference call using a conference server, the method comprising the steps of:
    generating a session initiation protocol, SIP, request message;
    transmitting the SIP request message to the conference server; and
    creating, modifying or deleting the conference call by manipulating the SIP request message;
    wherein the SIP request message comprises conference information regarding the conference call represented in a markup language; and
    wherein the conference information includes at least one of a date and time of the conference call, and establishment methods for the conference call.

2. The method according to claim 1, further comprising the step of addressing the SIP request message to a SIP address (Universal Resource Identifier) which represents a location of conference creating means of the conference server, and wherein the SIP request message is transmitted to the SIP address.

3. The method according to claim 1 or 2, wherein at least some of the conference information is provided in a header portion of the SIP request message.

4. An electronic communication device for participating in a conference call and configured to generate a session initiation protocol, SIP, request message, and to create, modify or delete the conference call by manipulating the SIP request message, wherein the SIP request message comprises conference information regarding the conference call represented in a markup language, and wherein the conference information includes at least one of a date and time of the conference call, and establishment methods for the conference call.

5. The electronic communication device according to claim 4 further configured to address the SIP request message to a SIP address (Universal Resource Identifier) which represents a location of conference creating means of the conference server, and wherein the SIP request message is transmitted to the SIP address.

6. The electronic communication device according to claim 4, further configured to provide at least some of the conference information in a header portion of the SIP request message.

7. A conference server for establishing a conference call, wherein the conference server is configured to receive a SIP request message, the SIP request message comprising conference information regarding the conference call represented in a markup language; to allocate a SIP address (Universal Resource Identifier) to the conference call; to generate a SIP response message in response to the SIP request message; to transmit the SIP response message to a client terminal, wherein the SIP response message comprises an indication of a duration of a validity of the SIP address; and to create, modify or delete the conference call in response to a manipulation of the SIP request message by the client terminal.

8. A conference system for establishing a conference call comprising:
    an electronic communication device for participating in the conference call and configured to generate a session initiation protocol, SIP, request message, and to create, modify or delete the conference call by manipulating the SIP request message, wherein the SIP request message comprises conference information regarding the conference call represented in a markup language; and
    a conference server for establishing the conference call, wherein the conference server is configured to receive the SIP request message; to allocate a SIP address (Universal Resource Identifier) to the conference call; to generate a SIP response message in response to the SIP request message; and to transmit the SIP response message to a client terminal, wherein the electronic communication device is arranged to be in communication with the conference server via a communication network, and wherein the SIP response message comprises an indication of a duration of a validity of the SIP address.

9. A terminal device comprising computer program code means configured to cause a processor to perform a method for establishing a conference call using a conference server, the method comprising the steps of:
    generating a session initiation protocol, SIP, request message;
    transmitting the SIP request message to the conference server; and
    creating, modifying or deleting the conference call by manipulating the SIP request message;
    wherein the SIP request message comprises conference information regarding the conference call represented in a markup language; and wherein the conference information includes at least one of a date and time of the conference call, and establishment methods for the conference call.

10. The terminal device according to claim 9, wherein the method further comprises the step of addressing the SIP request message to a SIP address (Universal Resource Identifier) which represents a location of conference creating means of the conference server, and wherein the SIP request message is transmitted to the SIP address.

11. The terminal device according to claim 10, wherein the method further comprises the step of creating, modifying or deleting the conference call by manipulating the SIP request message which comprises the conference information regarding the conference call represented in the markup language.

12. The terminal device according to claim 9, wherein the method further comprises the step of creating, modifying or deleting the conference call by manipulating the SIP request message which comprises the conference information regarding the conference call represented in the markup language.

13. The terminal device according to claim 9, 10, 11 or 12, wherein, in the method, at least some of the conference information is provided in a header portion of the SIP request message.

14. The electronic communication device according to claim 5, further configured to provide at least some of the conference information in a header portion of the SIP request message.

15. The conference system according to claim 8, wherein the electronic communication device is further configured to address the SIP request message to a SIP address (Universal Resource Identifier) which represents a location of conference creating means of the conference server, and wherein the SIP request message is transmitted to the SIP address.

16. The conference system according to claim 15, wherein the electronic communication device is further configured to provide at least some of the conference information in a header portion of the SIP request message.

17. The conference system according to claim 8, wherein the electronic communication device is further configured to provide at least some of the conference information in a header portion of the SIP request message.

* * * * *